United States Patent Office 3,461,189
Patented Aug. 12, 1969

3,461,189
PROCESS FOR PREPARING SULFENYL CHLO-
RIDES AND ORGANIC THIONOPHOSPHORUS
CHLORIDES
Roger M. Nagel, Pennington, N.J., assignor to The
Lubrizol Corporation, Wickliffe, Ohio, a corpo-
ration of Ohio
No Drawing. Filed Oct. 28, 1965, Ser. No. 505,457
Int. Cl. C07f 9/20, 9/52; C07c 145/00
U.S. Cl. 260—986
9 Claims

ABSTRACT OF THE DISCLOSURE

Process for preparing organic sulfur- and phosphorus-containing acid chloride and sulfenyl chlorides by the reaction of a sulfur- and phosphorus-containing ester with sulfuryl chloride. The sulfenyl chloride is a useful chemical intermediate, e.g., it may be reacted in situ with olefinic compounds to form chlorothioethers. The chlorothioethers are useful as extreme pressure additives for lubricating compositions.

This invention relates to a novel process for preparing sulfenyl chlorides, chlorothioether derivatives of sulfenyl chlorides, and organic sulfur- and phosphorus-containing acid chlorides.

The sulfenyl chlorides in general are very reactive compounds which, although difficult to prepare, have properties making them useful as chemical intermediates. They are usually prepared by reacting mercaptans or organic disulfides with chlorine or an active chlorinating agent; however, their preparation and use is frequently avoided because of the difficulties arising from the storage and handling of mercaptans and disulfides, particularly the lower molecular weight mercaptans and disulfides which are extremely malodorous.

The organic sulfur- and phosphorus-containing acid chlorides with which this invention is concerned have a central pentavalent phosphorus atom to which are bonded a chlorine atom, a sulfur atom (double bonded) and two organic radicals. The organic radicals are attached to the phosphorus atom either directly through a carbon-to-phosphorus bond or indirectly through a bridging oxygen atom. This class of compounds is generically defined by the formula:

in which R' and R" are organic radicals or oxy organic radicals. These include phosphinothiochloridates, phosphonothiochloridates, and phosphorothiochloridates.

The preparation of phosphinothiochlorides has been effected in the past by processes which are difficult and give poor yields such as, for example, the sulfurization of the corresponding (difficultly available) monochlorophosphines and by the method described in U.S. Patent 2,724,725 in which a diorgano phosphinodithioic acid is reacted with anhydrous hydrogen chloride.

It is accordingly an object of this invention to provide a novel and convenient method for the preparation of organic sulfenyl chlorides.

It is also an object of this invention to provide a novel method for the preparation of chloroalkyl thioethers.

It is a further object of this invention to provide a novel method for the preparation of organic sulfur- and phosphorus-containing acid chlorides.

These and other objects are attained by the process of preparing sulfenyl chlorides and compounds having the formula:

which comprises reacting at a temperature of from about −80° C. to about 20° C. a sulfur- and phosphorus-containing ester having the formula:

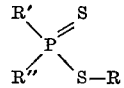

wherein R is alkyl or aryl and R' and R" are alkyl, alkoxy, aryl, or aryloxy with sulfuryl chloride.

The process may be more clearly illustrated by reference to the following equation:

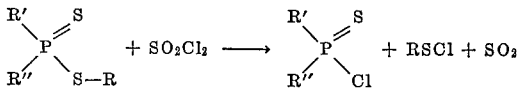

The sulfur- and phosphorus-containing esters represented by the above formula include alkyl and aryl esters of phosphinodithioic acids, phosphonodithioic acids, and phosphorodithioic acids depending upon whether R' and R" are organic radicals or oxy organic radicals. If R' and R" are alkyl or aryl radicals both directly attached to the phosphorus atom by a carbon-to-phosphorus bond, the ester is a phosphinodithioic acid ester. If one of the radicals R' or R" is an alkyl or aryl radical directly attached to the phosphorus atom through a carbon-to-phosphorus bond and the other radical is an alkoxy or aryloxy radical, the ester is a phosphonodithioic acid diester. Similarly, if both R' and R" are alkoxy or aryloxy radicals the ester is a phosphorodithioic acid triester.

The organic radicals R, R' and R" of the sulfur- and phosphorus-containing esters which are useful for the purposes of this invention consist of hydrocarbon radicals and substituted hydrocarbon radicals including aromatic, aliphatic, and cycloaliphatic radicals such as alkyl, aryl alk-aryl, aralkyl, and cycloalkyl radicals. Such radicals may contain a polar substtiuent such as chloro, bromo, nitro, cyano, alkoxy, etc., groups. In most instances, there should be no more than one such polar group in a radical. Specific examples of such suitable radicals are methyl, ethyl, isopropyl, sec-butyl, tert-butyl, isobutyl, n-pentyl, octyl, dodecyl, cyclohexyl, cyclopentyl, 2-heptylcyclohexyl, phenyl, naphthyl, xenyl, p-heptylphenyl, 2,6-di-tert-butylphenyl, polyisobutenylphenyl, polypropenylphenyl, benzyl, phenylethyl, 3,5-didodecylphenyl, chlorophenyl, alpha-methoxy-beta-naphthyl, 3 - nitrophenyl, 2 - bromoethyl, 3-chlorocyclohexyl, 4-nitrobutyl, etc. The organic radicals R, R' and R" may each have from one carbon atom to as many as perhaps 1000 carbon atoms in a polyisobutenylphenyl radical, usually these radicals will each have from one to about 50 carbon atoms.

A preferred class of sulfur- and phosphorus-containing esters comprises the triesters derived from phosphorodithioic acid. A convenient method for preparing such phosphorodithioic acid triesters involves the reaction of an O,O'-di-substituted phosphorodithioic acid with an olefinically unsaturated hydrocarbon, as is described in U.S. Patent 2,976,308. Another convenient method for preparing triesters of phosphorodithioic acids involves the reaction of an O,O'-di-substituted phosphorodithioic acid with a normally gaseous olefin under superatmospheric pressure as is described in U.S. Patent 2,802,856. Still another method involves the reaction of a metal O,O'-di-substituted phosphorodithioate with a halogen-substituted hydrocarbon.

The O,O'-di-substituted phosphorodithioic acids from which the phosphorodithioic acid triesters can be derived are well known. They are prepared by the reaction of phosphorus pentasulfide with an alcohol or a phenol. The reaction involves 4 moles of the alcohol or phenol per mole of phosphorus pentasulfide and may be carried out within the temperature range of from about 50° C. to about 200° C. Thus, the preparation of O,O'-di-n-hexyl-phosphorodithioic acid involves the reaction of phosphorus pentasulfide with 4 moles of n-hexyl alcohol at about 100° C. for about 2 hours. Hydrogen sulfide is liberated and the residue is the defined acid.

The phosphinodithioic acids from which the phosphinodithioic acid esters can be derived are also well known. They are prepared by the reaction of phosphorus pentasulfide with a hydrocarbon in a modified Friedel-Crafts synthesis in which aluminum chloride is used as the catalyst. The reaction is best carried out in an excess of the hydrocarbon as a solvent at the reflux temperature of the hydrocarbon.

The reaction of phosphoro-, phosphono-, or phosphinodithioic acid esters with sulfuryl chloride is carried out at temperatures of from about −80° C. to about 20° C. Preferably at temperatures of from about −50° to about −10° C. Because of the reactive nature of the chemicals involved, it is usually advantageous to carry out the reaction in the presence of a dry, inert solvent diluent such as, for example, chloroform, carbon tetrachloride, tetrachloroethane, hexachloroethane, benzene, etc.

The ratio of sulfur- and phosphorus-containing ester to sulfuryl chloride is usually 1:1 molar. However, an excess of either reactant may be used and it is particularly advantageous to use an excess of sulfuryl chloride to ensure complete reaction of the ester.

The products of the reaction, i.e., the phosphorophosphono-, or phosphinothiochloridate and the sulfenyl chloride can be separated by known methods such as for example, the selective extraction of the mixture with a suitable inert solvent or solvent mixture, low temperature, vacuum distillation, etc. The method of separation to be used is dependent on the nature of the product mixture.

It has been found, however, that resolution of the product mixture from the foregoing reaction is not necessary when it is desired to further react the sulfenyl chloride with an olefinic compound to form a chlorothioether. In this case, a suitable olefinic compound is introduced into the unresolved mixture of the sulfenyl chloride and sulfur- and phosphorus-containing acid chloride while it is maintained at a temperature of from about −80° C. to about 20° C. preferably at from about −50° C. to about −10° C. The resulting mixture of a chlorothioether and a phosphoro-, phosphono-, or phosphinothiochloridate can then be easily separated, for example, by vacuum distillation.

The reaction of the sulfenyl chloride and the olefinic compound requires about equimolar proportions of these reactants. It is usually advantageous to use an excess of the olefinic compound which is easily recovered in the subsequent vacuum distillation.

The olefinic compound useful for the purposes of this invention to be combined with the sulfenyl chloride is generally an alkene, i.e., a hydrocarbon which contains at least one double bond. Olefinic compounds containing other elements in addition to carbon and hydrogen, e.g., those having halogen, nitro, etc., substituents as well as ether or sulfide linkages may in some cases be desirable, although it is preferred to employ olefins. Specific examples of useful olefinic compounds include ethylene, propylene, butenes, pentenes, hexenes, octenes, decenes, cyclohexene, styrene, divinyl benzene, allyl chloride, vinyl chloride, acrylonitrile, etc.

The following examples are illustrative of the process of this invention for preparing sulfenyl chlorides, chlorothioether derivatives of sulfenyl chlorides and the sulfur- and phosphorus-containing acid chlorides.

Example 1

A solution of 97 parts (0.4 mole) of S-n-butyl diethylphosphorodithioate in 150 parts of carbon tetrachloride is cooled to −40° C. and a solution of 54 parts (0.4 mole) of sulfuryl chloride in 50 parts carbon tetrachloride is added slowly; the mixture is stirred for an additional one-half hour while maintaining the temperature at −40° C. to −35° C. To this orange-colored product mixture, 41 parts (0.5 mole) of cyclohexene is added at −35° C. and the mixture is stirred for one hour with the temperature being allowed to rise to 20° C. while color changes to a light yellow color. The crude reaction product is washed with a 5% aqueous solution of sodium bicarbonate, washed with water and extracted with 200 parts of ether. The ether solution of products is washed with water, dried over anhydrous magnesium sulfate, stripped to 50° C. at 15 mm. and fractionated under vacuum. Diethylphosphorothiochloridate distills from the product mixture at 77° C. and 5–6 mm. and is found to have the following analysis: refractive index 1.4715, 19.13/18.81% chlorine, 16.04/16.44% phosphorus, and 16.57/16.98% sulfur. From the product mixture, 2-chlorocyclohexyl n-butyl sulfide also distills at 67°–68° C. and 0.15–0.2 mm. having the following analysis: 15.45/17.15% chlorine and 14.84/15.49% sulfur.

Example 2

The process of Example 1 is repeated except that in place of cyclohexene, 50 parts (0.45 mole) of purified octene-1 is used. Diethylphosphorothiochloridate is recovered from the product mixture by distillation at 73°–74° C. at 4–5 mm. It is found to have a refractive index of 1.4712 and to contain 18.81/18.81% chlorine, 16.15/16.44% phosphorus and 17.23/16.98% sulfur. Also recovered from the product mixture is a sulfide which is throught to be 2-chloro-octyl n-butyl sulfide by distillation at 78°–80° C. at 0.15 mm. This product is found to contain 14.79/14.98% chlorine and 13.28/13.55% sulfur.

Example 3

The process of Example 1 is again repeated except that in place of cyclohexene, 27.5 parts (0.5 mole) of cis-butene-2 is used. Diethylphosphorothiochloridate is recovered from the product mixture by distillation at 65° C. and 2.5 mm. having a refractive index of 1.4726. A sulfide is distilled from the reaction mixture at 67° C. and 1.3 mm. which is thought to be 1-methyl, 2-chloro, propyl, n-butyilsulfide having a refractive index of 1.4773.

Example 4

The process of Example 1 is repeated except that 97 parts (0.4 mole) of S-sec.-butyl diethylphosphorodithioate is used instead of S-butyl diethylphosphorodithioate. The diethylphosphorothiochloridate, distilled from the reaction product at 72° C. and 4.4 mm., is found to contain 18.48/18.81% chlorine, 15.93/16.44% phosphorus, 17.11/16.98% sulfur, and to have a refractive index of 1.4713. Also distilled from the reaction mixture at 62° C. and 0.15 mm. is 2-chlorocyclohexyl, 2-methylpropyl sulfide having the following analysis: 16.43/17.15% chlorine, 15.77/15.49% sulfur, and 0.58/0% phosphorus.

Example 5

The process of Example 1 is repeated except that 97 parts (0.4 mole) of S-sec.-butyl diethylphosphorodithioate and 50 parts (0.45 mole) of ocetene-1 is used. The diethylphosphorothiochloridate, distilled from the product mixture at 69° C. and 3 mm., is found to have a refractive index of 1.417 and to contain 19.05/18.81% chlorine, 15.79/16.44% prosphorus, and 17.32/16.98% sulfur. 2-chloro-octyl, 2-methyl propyl sulfide is also distilled from the product mixture at 76° C. and 0.15 mm. and is found to contain 15.09/14.98% chlorine, 13.70/13.55% sulfur and 0.24/0% phosphrous.

Example 6

The process of Example 1 is repeated except that 107.5 parts (0.4 mole) of S-cyclohexyl diethylphosphorodithioate is used. From the washed and dried product mixture, diethylphosphorothiochloridate is distilled at 72° C. and 4 mm. It is found to have a refractive index of 1.4714 and to contain 18.69/18.81% chlorine, 16.01/16.44% phosphorus, and 17.25/16.98% sulfur. 2-chlorocyclohexyl cyclohexyl sulfide is also distilled from the product mixture at 92°–93° C. at 0.1–0.15 mm. and is found to have a refractive index of 1.5315 and to contain 12.44/15.25% chlorine, 15.56/13.78% sulfur, and 0.28/0% phosphorus.

Example 7

The process of Example 1 is repeated except that there is used 107.5 parts (0.4 mole) of S-cyclohexyl diethylphosphorodithioate and 50 parts (0.45 mole) of ocetene-1. From the product mixture diethylphosphorothiochloridate is distilled at 40° C. and 0.9 mm. having a refractive index of 1.4712 and containing 18.73/18.81% chlorine, 16.18/16.44% phosphorus and 17.24/16.98% sulfur. Also distilled from the product mixture at 53°–55° C. and 2–3 mm. is 2-chloro-octyl cyclohexyl sulfide having a refractive index of 1.4974 and containing 12.89/13.48% chlorine, 12.89/12.2% sulfur and 0.76/0% phosphorus.

Example 8

The process of Example 1 is repeated except that 120 parts (0.4 mole) of tributylphosphorodithioate is used and 17 parts (0.6 mole) of ethylene are used. From the reaction mixture at 80.5° C. and 8 mm. is distilled butyl, 2-chloroethyl sulfide having a refractive index of 1.4830 and containing 23.24/23.25% chlorine, 20.91/21.0% sulfur, and 0.018/0% phosphorus. From the reaction mixture is also distilled at 120° C. and 5 mm. dibutylphosphorothiochloridate having a refractive index of 1.4662 and containing 15.40/14.49% chlorine, 12.12/12.67% phosphorus and 12.55/13.1% sulfur.

Example 9

A solution of 34 parts (0.25 mole) of sulfuryl chloride in 50 parts of carbon tetrachloride is added dropwise at −40° C.–−30° C. to 82 parts (0.25 mole) of S-octyl diisopropylphosphorodithioate in 150 parts of carbon tetrachloride and the mixture is held for 0.5 hour at −30° C. with stirring. Cyclohexene, 22.2 parts (0.27 mole) is added at −30° C. and the reaction mixture is stirred for 2 hours while allowing the temperature to rise to 20° C. The product mixture is allowed to stand overnight, is stripped to 40° C. at 15 mm. to remove solvent and then vacuumed distilled at 38° C. and 0.35 mm. to obtain diisopropylphosphorothiochloridate containing 17.18/16.37% chlorine, 13.72/14.31% phosphorus, and 14.75/14.81% sulfur. From the product mixture 2-chlorocyclohexyl octyl sulfide is also distilled at 45° C. and 0.4 mm.

Example 10

A solution of 34 parts (0.25 mole) of sulfuryl chloride in 50 parts of carbon tetrachloride is added dropwise to a solution of 83.5 parts (0.25 mole) of S-hexyldiphenylphosphinodithioate in 150 parts of carbon tetrachloride at −30° C.–−25° C. and the mixture is stirred at −30° C. for an additional 15 minutes. Cyclohexene, 24.6 parts (0.30 mole) is added dropwise at −30° to −20° C. and the mixture is stirred for an additional 1.5 hours while the temperature is allowed to rise to 20° C. The product mixture is stripped to 40° C. at 15 mm. to remove carbon tetrachloride and is then vacuumed distilled at 117.5° C. and 0.65 mm. to obtain 2-chlorocyclohexyl hexyl sulfide containing 14.05/15.10% chlorine, and 14.21/13.65% sulfur. Also distilled from the product mixture at 156° C. and 0.4 mm. is diphenylphosphinothiochloridate containing 14.31/14.04% chlorine, 12.04/12.27% phosphorus, and 13.04/12.68% sulfur.

Example 11

The process of Example 10 is repeated except that in place of cyclohexene, 21 parts (0.30 mole) of pentene-2 is used. From the product mixture, a chloroalkyl sulfide which is probably a mixture of 1-methyl, 2-chlorobutyl hexyl sulfide and 1-ethyl, 2-chloropropyl hexyl sulfide is distilled at 88°–93° C. and 0.45–0.5 mm. which contains 16.25/16.90% chlorine and 14.45/15.27% sulfur. Diphenylphosphinothiochloridate is also distilled from the product mixture at 144.5° C. and 0.15 mm. containing 14.24/14.04% chlorine, 11.95/12.27% phosphorus and 12.40/12.68% sulfur.

Example 12

The process of Example 10 is repeated except that 83.5 parts (0.25 mole) of S-cyclohexyl diphenylphosphinodithioate is used and that the product mixture is washed three times with five percent sodium bicarbonate solution and then with water and dried. From the product mixture 2-chlorocyclohexyl cyclohexyl sulfide is distilled at 133° C. and 1.5 mm. having 12.45/15.10% chlorine, 15.96/13.65% sulfur, and 0.27/0% phosphrous. Diphenylphosphinothiochloridate is also distilled from the product mixture at 144–145° C. and 0.15–0.3 mm. containing 13.55/14.04% chlorine, 11.30/12.27% phosphorus, and 13.49/12.68% sulfur.

Example 13

The process of Example 1 can be repeated using 0.25 mole of O-phenyl, S-butyl ethylphosphonodithioate and 0.25 mole of butyne-2 to obtain O-phenyl ethylphosphonothiochloridate and 1-methyl, 2-chloropropenyl-1 sulfide.

Example 14

The process of Example 10 can be repeated using S-phenyl diphenylphosphorodithioate to obtain diphenylphosphinothiochloridate and 2-chlorocyclohexyl phenyl sulfide.

Example 15

The process of Example 10 can be repeated using S-butyl dibutylphosphinodithioate and propylene to obtain dibutyl phosphinothiochloridate and 2-chloropropyl butyl sulfide.

As can be seen from the foregoing examples, the sulfenyl chlorides produced by the process of this invention are useful as chemical intermediates in that they add to the unsaturated linkages of olefinic compounds to form chlorothioethers. The sulfenyl chlorides are also useful as powerful chlorinating agents.

The chlorothioethers obtained by the addition of the sulfenyl chlorides to olefinic compounds are useful among other things as extreme pressure additives for lubricating compositions, anti-oxidants, insecticides, etc.

The phosphorothiochloridates, phosphonothiochloridates and phosphinothiochloridates made by the process of this invention are useful as intermediates for the preparation of esters, thioamidates, and sulfur- and phosphorus-containing acid anhydrides, etc. They are also useful as insecticides.

I therefore particularly point out and distinctly claim as my invention:

1. The process of preparing sulfenyl chlorides and compounds having the formula:

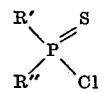

which comprises reacting at a temperature of from about −80° C. to about 20° C. a sulfur- and phosphorous-containing ester having the formula:

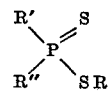

wherein R is alkyl or aryl and R' and R" are alkyl, alkoxy, aryl, or aryloxy and R, R' and R" each have from one to about 1000 carbon atoms with sulfuryl chloride.

2. The process of claim 1 wherein R' is alkyl or aryl, and R" is alkoxy or aryloxy.

3. The process of claim 1 wherein R' and R" are alkoxy or aryloxy.

4. The process of claim 1 wherein R' and R" are alkyl or aryl.

5. The process of claim 1 wherein R is hexyl and R' and R" are phenyl.

6. The process of claim 1 wherein R is butyl and R' and R" are butoxy.

7. The process of claim 1 wherein R is butyl and R' and R" are ethoxy.

8. The process of claim 1 wherein R is octyl and R' and R" are propoxy.

9. The process of claim 1 wherein R is hexyl and R' and R" are ethoxy.

References Cited

Michalski et al., Chem. Abstracts, vol. 60, pp. 4177–8 (1964).

CHARLES B. PARKER, Primary Examiner

A. H. SUTTO, Assistant Examiner

U.S. Cl. X.R.

252—48, 406; 260—543, 609, 960, 999